United States Patent
Asuri et al.

(10) Patent No.: US 9,397,711 B2
(45) Date of Patent: Jul. 19, 2016

(54) PRE-DISTORTION IN A WIRELESS TRANSMITTER

(71) Applicant: QUALCOMM Incorporated, San Diego, CA (US)

(72) Inventors: Bhushan Shanti Asuri, San Diego, CA (US); Thomas Domenick Marra, San Diego, CA (US); Mohammad Farazian, San Diego, CA (US); Gurkanwal Singh Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 14/083,240

(22) Filed: Nov. 18, 2013

(65) Prior Publication Data

US 2015/0139358 A1    May 21, 2015

(51) Int. Cl.
*H04B 1/04* (2006.01)
*H04L 27/36* (2006.01)
*H04B 17/00* (2015.01)

(52) U.S. Cl.
CPC ............ *H04B 1/0475* (2013.01); *H04B 17/001* (2013.01); *H04L 27/361* (2013.01); *H04L 27/367* (2013.01); *H04B 2001/0425* (2013.01)

(58) Field of Classification Search
CPC ....... H03F 1/32; H03F 1/3223; H03F 1/3241; H03F 1/3247; H03F 1/3252; H03F 1/3282; H04B 1/04; H04B 1/0458; H04B 1/0475; H04B 17/001; H04B 17/0015; H04B 2001/0425; H04L 27/04; H04L 27/08; H04L 27/20; H04L 27/361; H04L 27/364; H04L 27/367; H04L 27/368

USPC ........ 375/296, 297; 330/10, 124 R, 125, 126, 330/124 D, 134–137, 149; 381/94.1, 94.5; 455/67.13, 114.2, 114.3
See application file for complete search history.

(56) References Cited

U.S. PATENT DOCUMENTS

| | | | |
|---|---|---|---|
| 7,346,122 B1 | 3/2008 | Cao | |
| 7,945,223 B2 | 5/2011 | Lewis | |
| 8,059,748 B2 | 11/2011 | See et al. | |
| 2004/0151257 A1* | 8/2004 | Staszewski et al. | 375/296 |
| 2005/0271161 A1 | 12/2005 | Staszewki et al. | |
| 2006/0170505 A1* | 8/2006 | Humphreys et al. | 331/16 |
| 2007/0189431 A1* | 8/2007 | Waheed | H03C 3/0991 375/376 |
| 2007/0190952 A1* | 8/2007 | Waheed et al. | 455/114.3 |

(Continued)

FOREIGN PATENT DOCUMENTS

DE     102005060080 A1    6/2007

OTHER PUBLICATIONS

International Search Report and Written Opinion—PCT/US2014/065453—ISA/EPO—Feb. 20, 2015.

(Continued)

*Primary Examiner* — Young T Tse
(74) *Attorney, Agent, or Firm* — Arent Fox LLP (57) ABSTRACT

Exemplary embodiments are related to digital pre-distortion in envelope tracking systems. A device may include an amplitude modulation-to-phase modulation (AM-PM) distortion unit configured to generate an AM-PM distortion component in response to receipt of phase data of an input transmit signal. The device may also include a local oscillator (LO) path coupled to the distortion unit and configured to convey a local oscillator (LO) signal that varies based on the AM-PM distortion component.

20 Claims, 8 Drawing Sheets

(56) References Cited

U.S. PATENT DOCUMENTS

| | | |
|---|---|---|
| 2008/0268789 A1 | 10/2008 | Plaumann et al. |
| 2008/0318620 A1 | 12/2008 | Van |
| 2009/0074106 A1* | 3/2009 | See .................. H03C 5/00 375/297 |
| 2010/0111222 A1* | 5/2010 | Schimper et al. ............. 375/296 |
| 2010/0233977 A1* | 9/2010 | Minnis et al. .............. 455/127.1 |
| 2013/0088302 A1 | 4/2013 | Wu et al. |
| 2013/0094550 A1 | 4/2013 | Coan et al. |
| 2014/0184337 A1* | 7/2014 | Nobbe .................. H03F 1/0227 330/296 |

OTHER PUBLICATIONS

Mehta J., et al., "An Efficient Linearization Scheme for a Digital Polar EDGE Transmitter", IEEE Transactions on Circuits and Systems II, vol. 57, No. 3, Mar. 1, 2010, pp. 193-197, XP011305703, IEEE, US ISSN: 1549-7747.

* cited by examiner

PRE-DISTORTION IN A WIRELESS TRANSMITTER

BACKGROUND

1. Field

The present invention relates generally to data transmission with a wireless communication device. More specifically, the present invention includes embodiments for pre-distortion in envelope tracking systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, 3GPP2 Ultra Mobile Broadband (UMB) systems, and orthogonal frequency division multiple access (OFDMA) systems.

In a communication system, a transmitter may process (e.g., encode and modulate) data. The transmitter may further condition (e.g., convert to analog, filter, frequency up-convert, and amplify) the data to generate an output radio frequency (RF) signal. The transmitter may then transmit the output RF signal via a communication channel to a receiver. The receiver may receive the transmitted RF signal and perform the complementary processing on the received RF signal. The receiver may condition (e.g., amplify, frequency down-convert, filter, and digitize) the received RF signal to obtain input samples. The receiver may further process (e.g., demodulate and decode) the input samples to recover the transmitted data.

A transmitter typically includes a power amplifier (PA) to provide high transmit power for the output RF signal. Ideally, the power amplifier should be linear, and the output RF output should be linearly related to an input RF signal. However, in practice, the power amplifier typically has static nonlinearities as well as memory effects, as described below. The nonlinearities and memory effects of the power amplifier may generate distortion in the output RF signal, which may degrade performance.

A need exists for enhancing pre-distortion within a wireless transmitter. More specifically, a need exists for embodiments related to power amplifier pre-distortion in envelope tracking systems.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
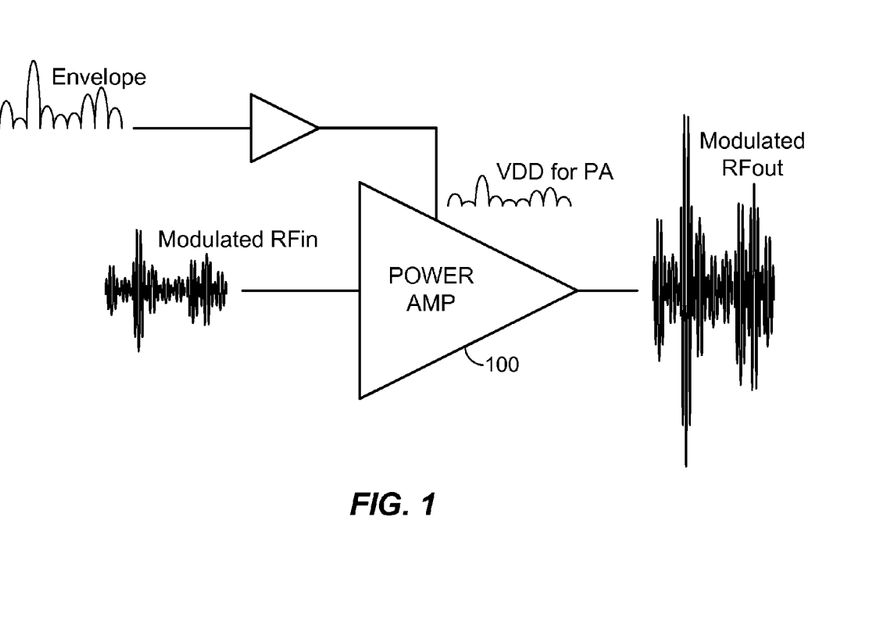
FIG. 1 depicts a device including a power amplifier configured for receiving a supply voltage that varies as a function of a signal level of an input signal.

As will be appreciated by a person having ordinary skill in the art, envelope tracking (ET) is a method for varying an input supply voltage of a power amplifier as a function of the signal level received by the power amplifier. As shown in FIG. 1, a power supply voltage VDD conveyed to a power amplifier 100 may be varied as a function of a single level received at input of power amplifier 100. The supply voltage is usually varied in a manner where the amplitude modulation-to-amplitude modulation (AM-AM) distortion is minimized over the power supply range but the amplitude modulation-to-phase modulation (AM-PM) distortion contributes to adjacent channel leakage ration (ACLR).

Traditional digital pre-distortion (DPD) systems rely on values of AM-AM and AM-PM distortion generated by prior characterization or some other prior information about a communication system. Further, a transmit modem has information about a transmit signal and hence an expected output power. From the expected output power and a desired supply voltage trajectory, the transmit modem may also have information on an anticipated AM-AM and AM-PM distortion. A traditional DPD system may corrects the anticipated AM-AM and AM-PM distortion by feeding in correction terms through I/Q channels.

The polar conversion of AM-AM and AM-PM distortion terms forces a significant bandwidth expansion and, thus a baseband filter of a transmitter must widen its corner frequency and become less selective (i.e., lets through components that would otherwise be filtered). Smaller baseband filter bandwidth is better for receiver band noise and for rejecting undesired components from a digital-to-analog converter. The correction signals may increase the peak-to-average of the I/Q channel signals, requiring more back off, which, at baseband, degrades receiver band noise. Conventional devices that utilize complex baseband filters having very sharp roll-off are challenging to design.

Figure 2:
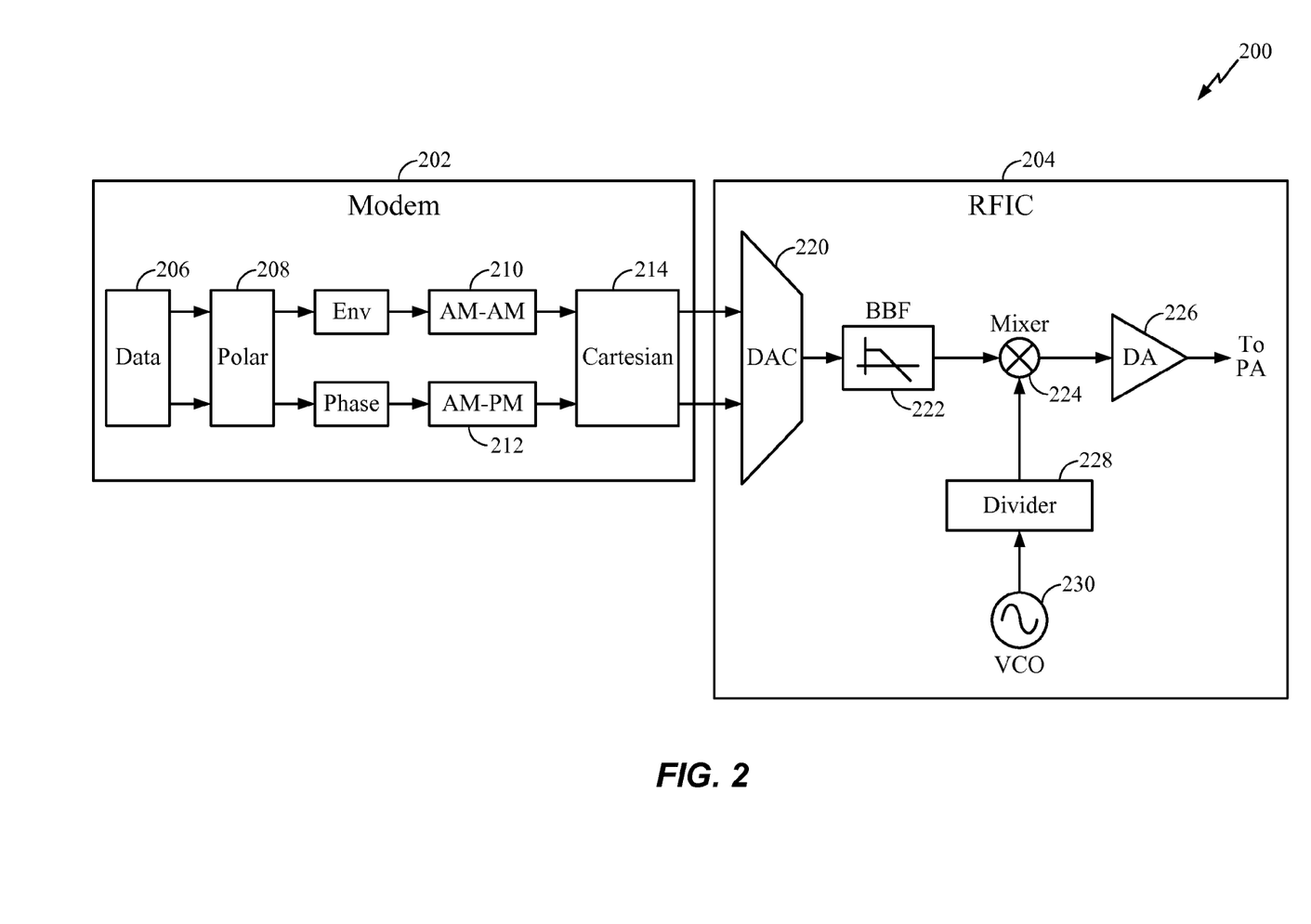
FIG. 2 illustrates a device including a modem coupled to a transmitter.

FIG. 2 illustrates a device 200 including a modem 202 coupled to a radio-frequency integrated circuit (RFIC) 204.

Modem 202 includes a data unit 206, a polar unit 208, amplitude modulation-to-amplitude modulation (AM-AM) correction unit 210, amplitude modulation-to-phase modulation (AM-PM) correction unit 212 and Cartesian unit 214. AM-AM correction unit 210 is configured to receive an envelope signal from polar unit 208 and AM-PM correction unit 212 is configured to receive a phase signal from polar unit 208.

RFIC 104 includes a digital-to-analog converter (DAC) 220, a baseband filter 222, a mixer 224, a driver amplifier 226, a voltage controlled oscillator (VCO) 230, and a frequency divider 228. As will be appreciated by a person having ordinary skill in the art, an output of driver amplifier 226 may be coupled to a power amplifier (not shown in FIG. 1).

During operation of device 200, data unit 206 may generate data, which may then be converted from a Cartesian representation (i.e., Cartesian form) into polar representation (i.e., polar form) via polar unit 208. Further, amplitude correction may be applied to an envelope signal via AM-AM correction unit 210 and/or phase correction may be applied to phase signal via AM-PM correction unit 212. The envelope and phase signals may then be converted back into Cartesian representation, which is conveyed to DAC 220 of RFIC 104.

The digital baseband signal conveyed from Cartesian unit 214 may be converted to analog via DAC 220 and filtered via baseband filter 222. Thereafter, the baseband signal may be up-converted from baseband to RF via mixer 224. More specifically, mixer 224 may use a signal from VCO 230 and frequency divider 228 to up-convert the received baseband signal to an RF frequency. Further, a resulting RF signal may be conveyed from mixer 224 to driver amplifier 226, which may then conveyed the RF signal to a power amplifier. As will be appreciated by a person having ordinary skill in the art, a DAC, such as DAC 220, may produce undesired noise and/or spurious emissions.

Figure 3:
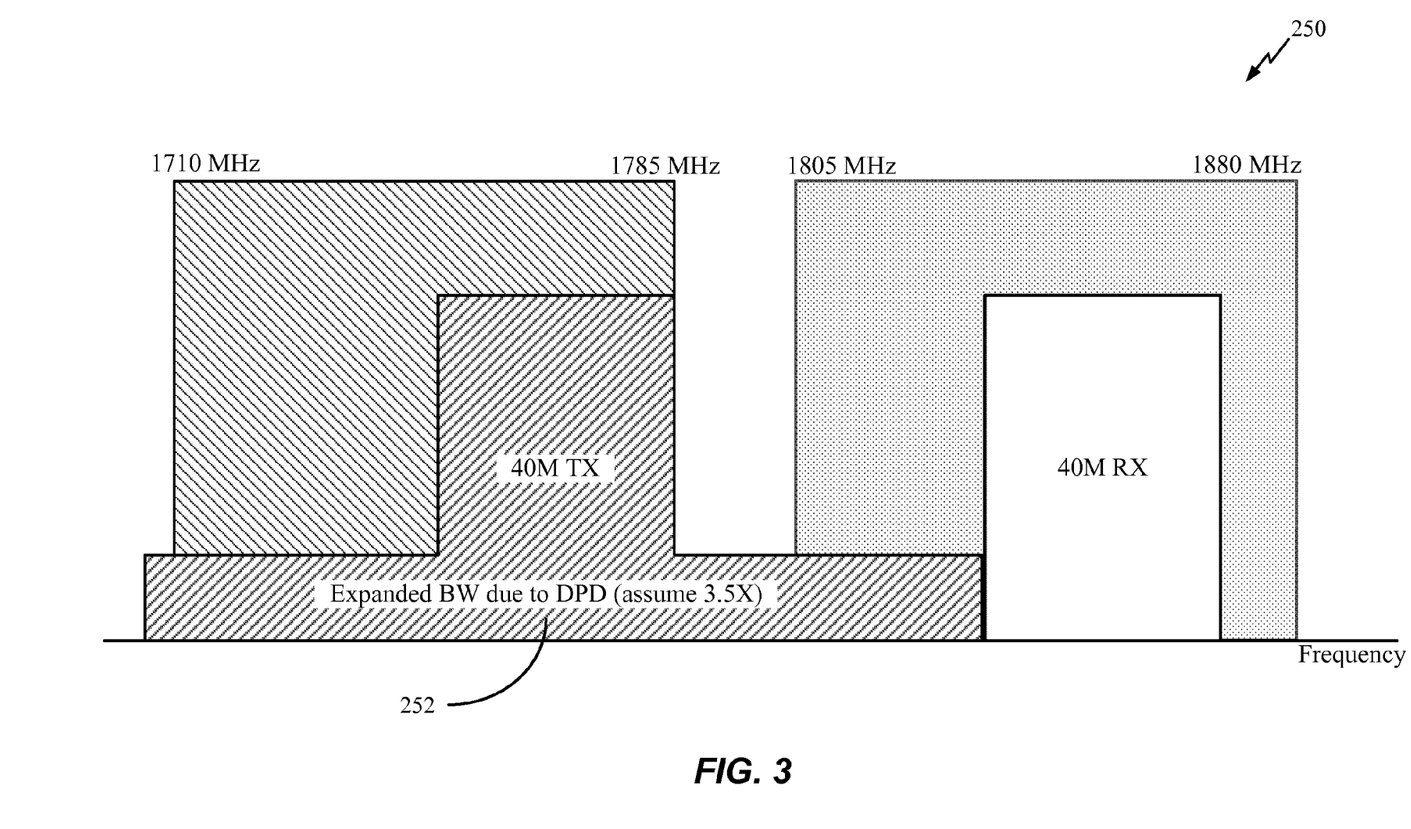
FIG. 3 is a plot illustrating a transmit band and a receive band of a wireless communication device.

FIG. 3 is a plot 250 depicting a transmit band (i.e., between 1710 MHz and 1785 MHz) a receive band (i.e., between 1805 MHz and 1880 MHz) of a wireless device. Further, plot 250 includes an LTE transmit channel (i.e., 40M TX) and a corresponding LTE receive channel (i.e., 40M RX) for LTE contiguous intra band uplink. As illustrated in plot 250, the LTE transmit channel 252 that includes an expanded bandwidth due to the polar conversion of the AM-AM and AM-PM distortion components. As noted above, a complex baseband filter, which has a very sharp roll-off and, thus, is difficult to design may be required to adequately reject undesired components within a transmitter of the wireless device.

Exemplary embodiments, as described herein, are directed to devices and methods related to digital pre-distortion in a wireless communication device. According to one exemplary embodiment, a device may include a digital pre-distortion unit configured to generate an AM-PM distortion component in response to receipt of an input transmit signal. The device may further include a local oscillator (LO) path coupled to the digital pre-distortion unit and configured to convey a local oscillator (LO) signal that varies based on the AM-PM distortion component. According to another exemplary embodiment, a device may include a digital pre-distortion unit configured to receive an input transmit signal and convey an AM-PM distortion component based on the input signal to one of a digital phase-lock loop (PLL) and a voltage controlled oscillator (VCO) for generating an local oscillator (LO) signal. The device may further include a mixer for receiving the input transmit signal and the LO signal and generating an RF transmit signal. In addition, the device may include a power amplifier configured to receive the RF transmit signal.

According to another exemplary embodiment, the present invention includes methods for performing pre-distortion in a wireless communication device. Various embodiments of such a method may include determining AM-PM distortion of a power amplifier based on an input transmit signal and pre-distorting the input transmit signal by varying an local oscillator (LO) signal based on the determined AM-PM distortion. Another embodiment may include generating an AM-PM distortion component based on an input transmit signal and modulating a phase of a local oscillator (LO) signal based on the AM-PM distortion component.

Other aspects, as well as features and advantages of various aspects, of the present invention will become apparent to those of skill in the art though consideration of the ensuing description, the accompanying drawings and the appended claims.

Figure 4:
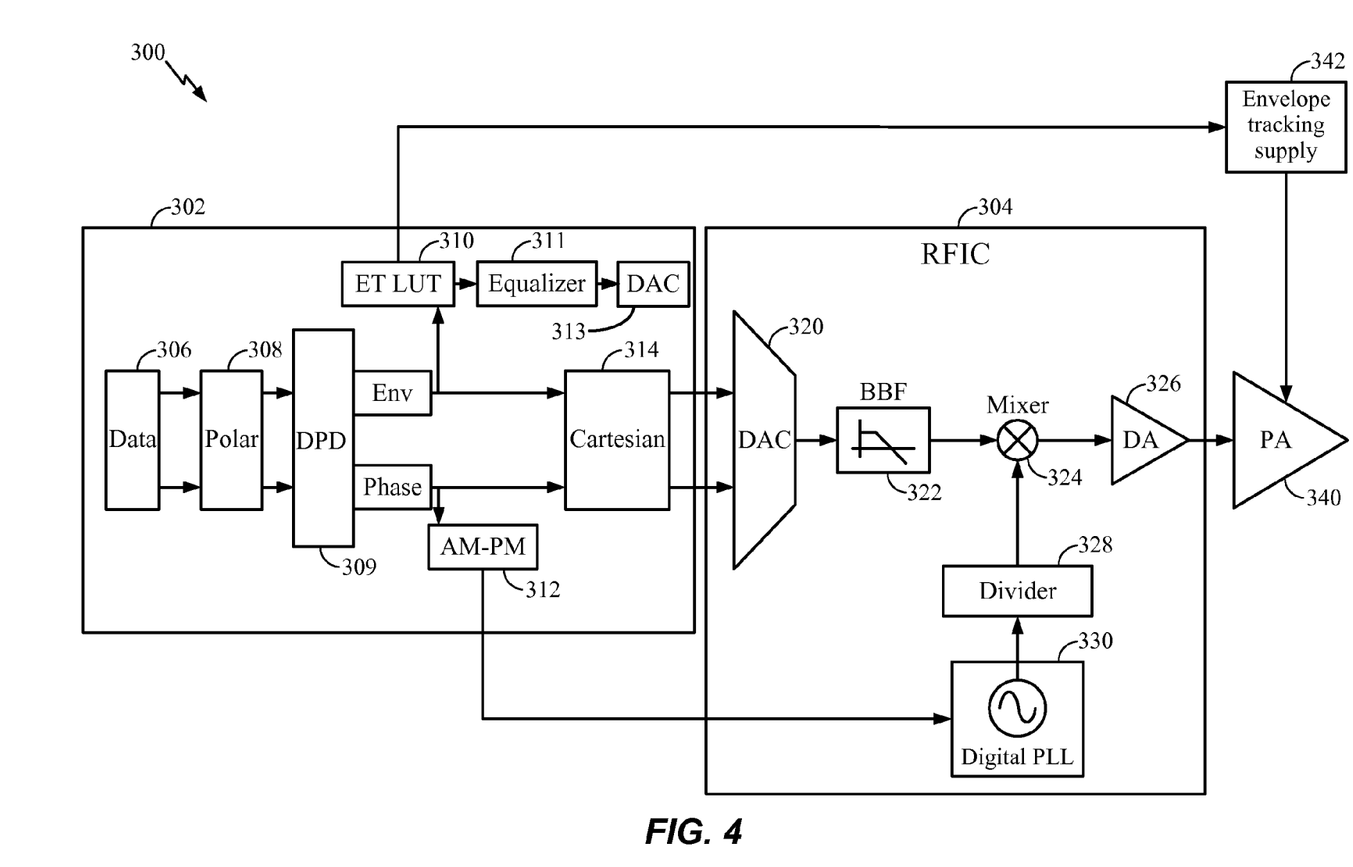
FIG. 4 depicts a device including amplitude modulation-to-amplitude modulation and amplitude modulation-to-phase modulation correction units, according to an exemplary embodiment of the present invention.

FIG. 4 illustrates a device 300, according to an exemplary embodiment of the present invention. Device 300 includes a digital module 302, which may comprise, for example, a modem, coupled to an RF module 304. By way of example only, RF module 304 may comprise an RFIC. Further, an output of RF module 304 is coupled to a power amplifier (PA) 340. Device 200 further includes an envelope tracking supply 342, which is coupled between digital module 302 and power amplifier 340.

Digital module 302 includes a data unit 306, a polar unit 308, a digital pre-distortion (DPD) unit 309, an envelope tracking unit 310, equalizer 311, a digital-to-analog converter (DAC) 313, amplitude modulation-to-phase modulation (AM-PM) correction unit 312 and Cartesian unit 314. As will be appreciated, data unit 306 may convey a Cartesian signal, which is converted to polar representation by polar unit 308. Polar representation is defined by envelope and phase components.

DPD unit 309 may be configured to generated pre-distorted envelope and phase signals based on received signal phase and envelope, behavioral characteristics of power amplifier 340, and environmental parameters (e.g., temperature and output impedance conditions). Stated another way, DPD unit 309 uses polar representation envelope combined with information about a power amplifier to generate amplitude modulation-to-phase modulation (AM-AM) and amplitude modulation-to-phase modulation (AM-PM) pre-distortion in polar representation.

Envelope tracking unit 310 may be configured to generate an envelope tracking supply as a function of the envelope of the transmit signal with de-troughing to avoid deep nulls in the envelope tracking supply. Equalizer 311 may be configured to compensate for droop in the frequency response of the envelope tracking supply.

RF module 304 includes DAC 320, a baseband filter 322, a mixer 324, a driver amplifier 326, a frequency divider 328, and a digital phase-lock loop (PLL) 330. According to various exemplary embodiments of the present invention, PLL 330 may include a digital PLL with a digital VCO, a digital PLL with a DAC and an analog VCO, a PLL and a VCO followed by a modulated digital to time converter (DTC) (e.g., the DTC may be coupled between divider 328 and mixer 324).

As illustrated in FIG. 4, one output of DPD unit 309 (i.e., configured for conveying envelope data) is independently coupled to an input of Cartesian unit 314 and an input of envelope tracking unit 310 and another output of DPD unit 309 (i.e., configured for conveying phase data) is independently coupled to another input of Cartesian unit 314 and an input of AM-PM correction unit 312. Moreover, an output of envelope tracking unit 310 is coupled to envelope tracking supply 342 and AM-PM correction unit 312 is coupled to PLL 330. Accordingly, a substantial amount of the distortion components generated by DPD unit 314 are not transmitted through Cartesian unit 314 or DAC 320, and, therefore, a bandwidth of baseband filter 322 does not need to be expanded.

During operation of device 300, data unit 306 may generate data, which may then be converted from a Cartesian representation (i.e., Cartesian form) into polar representation (i.e., polar form) via polar unit 308. Further, amplitude correction may be applied to an envelope signal via DPD unit 309 and an AM-AM distortion component may be conveyed to envelope tracking supply 342 via envelope tracking unit 310, equalizer 311, and DAC 313. As will be appreciated by a person having ordinary skill in the art, by changing how much a power supply of a power amplifier is raised or lowered as a function of a power amplifier input signal can impact the AM-AM distortion of the power amplifier. In addition, phase correction may be applied to phase signal via DPD unit 309 and an AM-PM distortion component may be conveyed to digital PLL 330. A phase of a local oscillator (LO) signal conveyed to mixer 324 may be modified via the AM-PM distortion component. More specifically, a delay may be added to the LO signal, wherein the delay is opposite of an expected distortion delay of the input signal received by power amplifier 340. Stated another way, a delay of PLL 330 may be modulated as a function of an amplitude of the input signal received by power amplifier 340.

Further, the envelope and phase signals may be converted back into Cartesian representation via Cartesian unit 314, which may then convey the envelope and phase data, in Cartesian form, to DAC 320 of RF module 304. The digital baseband signals conveyed from Cartesian unit 314 may be converted to analog via DAC 320 and filtered via baseband filter 322. Thereafter, the baseband signal may be up-converted from baseband to RF via mixer 324. More specifically, mixer 324 may use a signal from digital PLL 330 and frequency divider 328 to up-convert the received baseband signal to an RF frequency. Further, a resulting RF signal may be conveyed from mixer 324 to driver amplifier 326, which may then conveyed the RF signal to PA 340.

It is noted that data available for digital pre-distortion may still be needed, namely a supply voltage versus an output power of the power amplifier and AM-PM versus the output power. It is further noted that the phase correction for each point in time is not completely converted to I/Q signals. Instead it is used directly to phase modulate a PLL, thus the bandwidth of the correction signal does not expand and the bandwidth of a baseband filter does not expand. The peak to average of the I/Q channel signals does not increase and thus the RXBN may be preserved.

It is further noted that at least a portion (e.g., a substantial amount) of amplitude modulation-to-phase modulation (AM-AM) pre-distortion as well as at least a portion of the signal envelope is conveyed through envelope tracking supply 342. Further, a substantial portion of the signal in Cartesian representation, at least a portion of AM-AM pre-distortion (i.e., after being converted to Cartesian), and at least a portion of the AM-PM pre-distortion (i.e., after being converted to Cartesian) is conveyed through DAC 320. Also, at least a portion (e.g., a substantial amount) of the AM-PM pre-distortion in polar representation and at least a portion of the signal phase in polar representation is conveyed to PLL 330. Accordingly, at least some portion of the polar representation phase and the AM-PM pre-distortion modulates the LO signal conveyed to mixer 324. As will be appreciated by a person having ordinary skill in the art, information may be sent via multiple paths. For example, polar representation envelope data may be sent to envelope tracking supply 342 (i.e., for supplying power amplifier 340) and may also be converted back to Cartesian and sent to RFIC 304.

Figure 5:
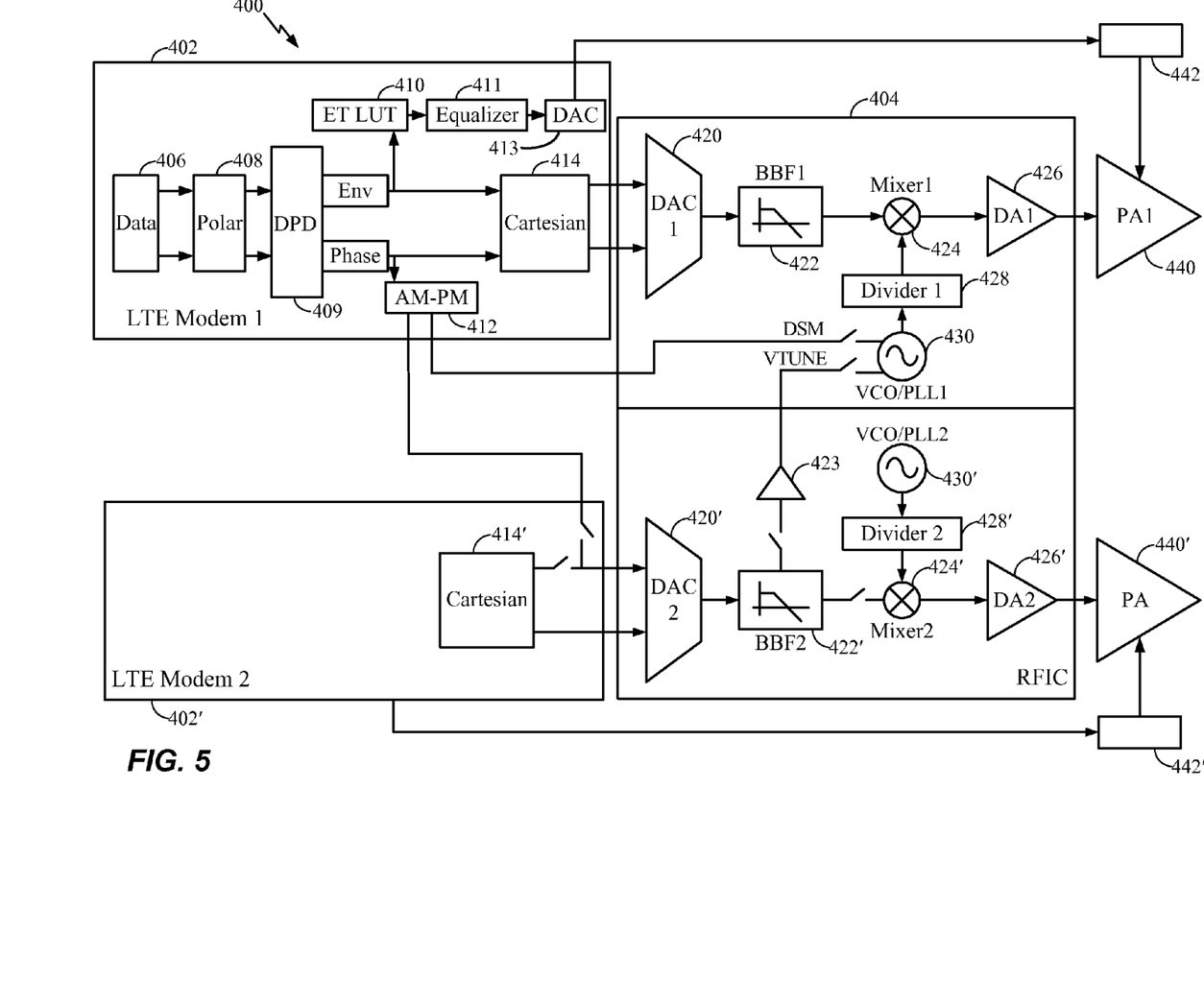
FIG. 5 illustrates another device including amplitude modulation-to-amplitude modulation and amplitude modulation-to-phase modulation correction units, according to an exemplary embodiment of the present invention.

FIG. 5 illustrates a device 400 including a plurality of transmit paths, according to another exemplary embodiment of the present invention. Device 400 includes a digital module 402 and a digital module 402', each of which may comprise, for example, a modem. As illustrated, units 402 and 402' are each coupled to a RFIC 404. Further, one output of RFIC 404 is coupled to a power amplifier 440 and another output of RFIC 404 is coupled to a power amplifier 440'. Device 400 further includes an envelope tracking supply 442, which is coupled between digital module 402 and power amplifier 440, and an envelope tracking supply 442', which is coupled between digital module 402' and power amplifier 440'.

Similar to digital module 302 illustrated in FIG. 4, digital module 402 includes a data unit 406, a polar unit 408, a DPD unit 409, an envelope tracking unit 410, an equalizer 411, a DAC 413, an AM-PM correction unit 412 and a Cartesian unit 414. Digital module 402' may include circuitry similar to digital module 402. RFIC 404 includes digital-to-analog converters (DACs) 420 and 420', baseband filters 422 and 422', mixers 424 and 424', driver amplifiers 426 and 426', voltage controlled oscillators 430 and 430', and frequency divider 428 and 428'. As will be appreciated by a person having ordinary skill in the art, digital module 402, power amplifier 440, and the associated components of RF module 404 may comprise one transmit path and digital module 402', power amplifier 440', and the associated components of RF module 404 may comprise another transmit path.

It will be appreciated that DAC 420' is ordinarily used for conveying transmit data for a second transmit path. DAC 420' is composed of two identical circuits that process the in-phase (I) and quadrature-phase(Q) signals during ordinary use. When DAC 420' is used to support AM-PM correction on the first transmit path, it cannot simultaneously support I/Q signal transmission through the second transmit path. The function of correcting AM-PM distortion requires only one of the two identical circuits in the DAC to be active. This is shown in the diagram by means of a programmable switch between 414' and 420'. The switch is used to control access to only one of the two identical circuits.

During one contemplated operation of device 400, data unit 406 may generate data, which may then be converted from a Cartesian representation (i.e., Cartesian form) into polar representation (i.e., polar form) via polar unit 408. Further, amplitude correction may be applied to an envelope signal via DPD unit 412 and an AM-AM distortion component may be conveyed to envelope tracking supply 442 via envelope tracking unit 410, equalizer 411, and DAC 413. In addition, phase correction may be applied to phase signal via DPD unit 409 and an AM-PM distortion component may be conveyed to digital PLL 430.

Further, the envelope and phase signals may be converted back into Cartesian representation via Cartesian unit 414, which may then convey the envelope and phase data, in Cartesian form, to DAC 420 of RF module 404. The digital baseband signals conveyed from Cartesian unit 414 may be converted to analog via DAC 420 and filtered via baseband filter 422. Thereafter, the baseband signal may be up-converted from baseband to RF via mixer 424. More specifically, mixer 424 may use a signal from digital PLL 430 and frequency divider 428 to up-convert the received baseband signal to an RF frequency. Further, a resulting RF signal may be conveyed from mixer 424 to driver amplifier 426, which may then conveyed the RF signal to PA 440.

In addition, while digital module 402', power amplifier 440', and the associated components of RFIC module 404 (i.e., DAC 420', baseband filter 422', mixer 424', driver amplifier 426', voltage controlled oscillator 430', and frequency divider 428') are inactive, the transmit path including digital module 402, power amplifier 440, and the associated components of RF module 404 may borrow DAC 420' and baseband filter 422' from the other transmit path. More specifically, a signal output from AM-PM correction unit 412 may be conveyed to digital PLL 430 via through DAC 420', baseband filter 422', and a buffer 423. This signal may be used as a voltage for tuning PLL 430. As will be appreciated, borrowing a DAC and a baseband filter from an inactive transmit path may eliminate the need to re-design a phase path DAC for a PLL/VCO to support higher data rate required for pre-distortion.

Figure 6:
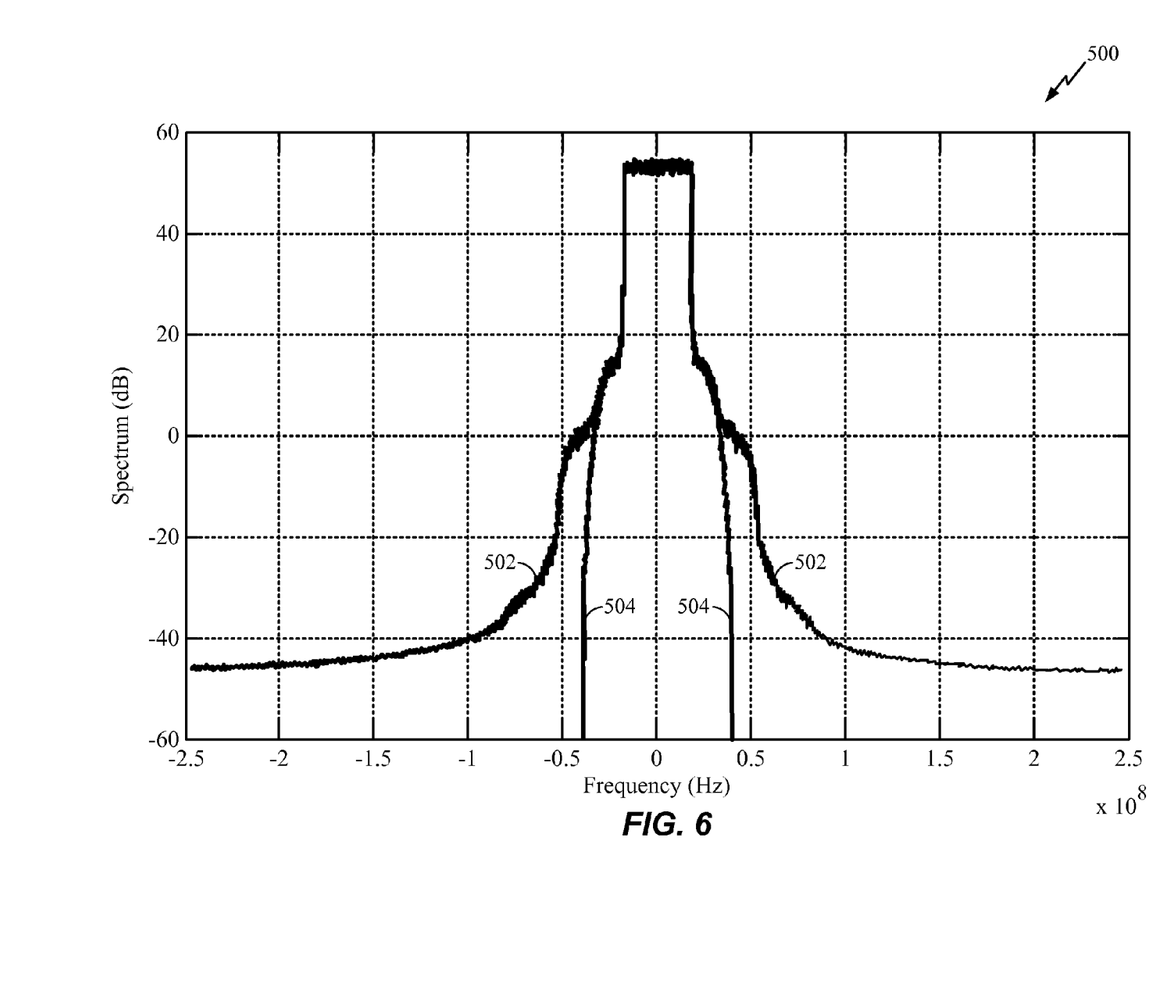
FIG. 6 is a plot depicting various signals of wireless communication device.
Figure 7:
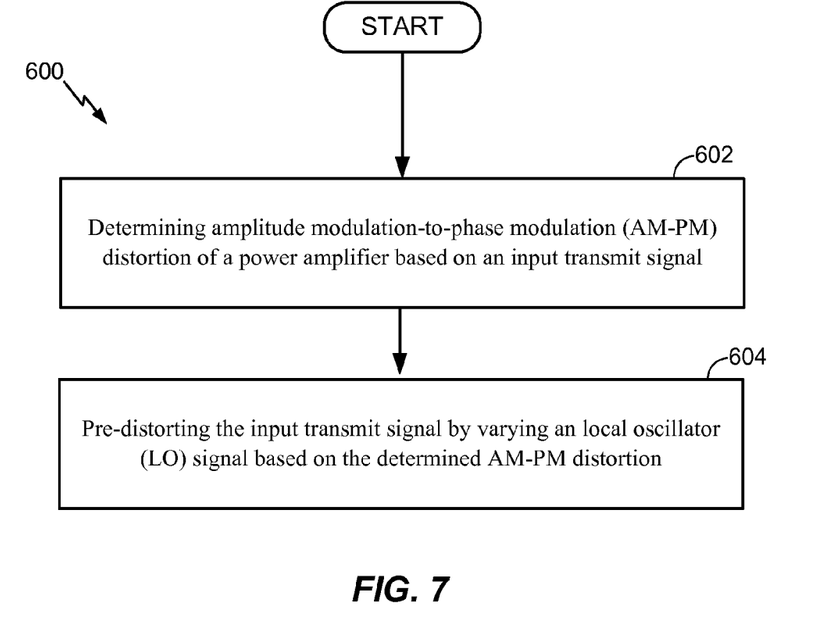
FIG. 7 is a flowchart depicting a method, in accordance with an exemplary embodiment of the present invention.

FIG. 6 depicts a plot 500 including various signals associated with a wireless communication device. A signal 502 of plot 500 illustrates a distorted signal corrected by pre-distortion as described with reference to FIGS. 4 and 5 and signal 504 depicts an ideal (i.e., perfect) transmit signal of a wireless communication device. As will be appreciated by a person having ordinary skill in the art, the residual noise associated with signal 504 is very low FIG. 7 is a flowchart illustrating a method 600, in accordance with one or more exemplary embodiments. Method 600 may include determining amplitude modulation-to-phase modulation (AM-PM) distortion of a power amplifier based on envelope data of an input transmit signal (depicted by numeral 602). Method 600 may also include pre-distorting the input transmit signal by varying an local oscillator (LO) signal based on the determined AM-PM distortion (depicted by numeral 604).

Figure 8:
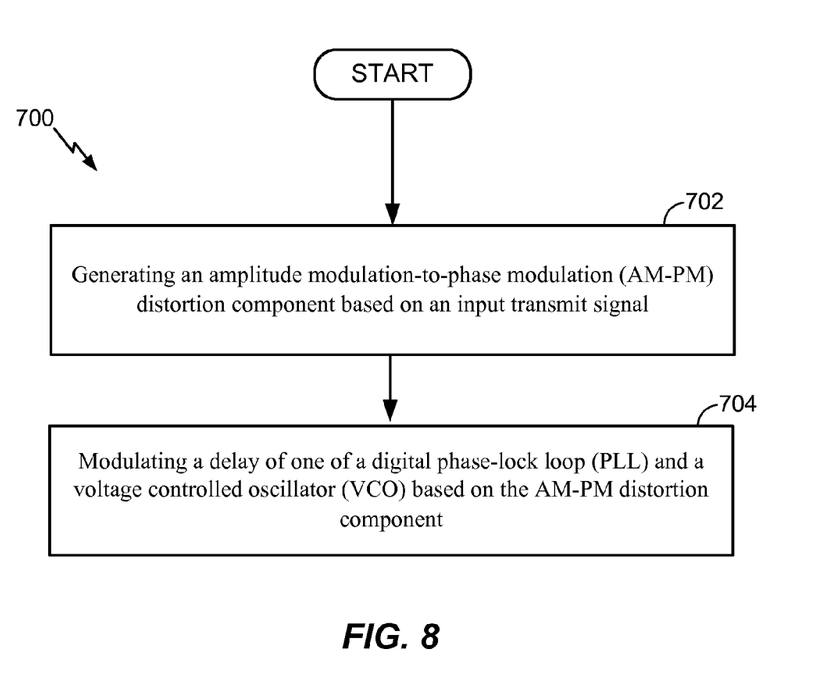
FIG. 8 is a flowchart depicting another method, in accordance with an exemplary embodiment of the present invention.

FIG. 8 is a flowchart illustrating another method 700, in accordance with one or more exemplary embodiments. Method 700 may include generating an amplitude modulation-to-phase modulation (AM-PM) distortion component based on an input transmit signal (depicted by numeral 702). Method 700 may further include modulating a delay of one of a digital phase-lock loop (PLL) and a voltage controlled oscillator (VCO) based on the AM-PM distortion component (depicted by numeral 704).

Figure 9:
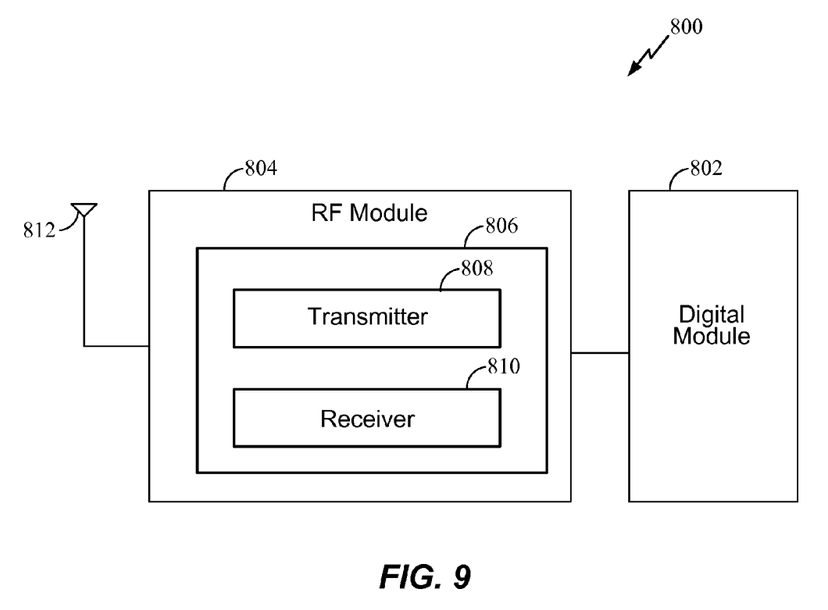
FIG. 9 illustrates a device including at least one antenna, in accordance with an exemplary embodiment of the present invention.

FIG. 9 is a block diagram of an electronic device 800, according to an exemplary embodiment of the present invention. By way of example only, device 800 may be configured to operate in an LTE system. According to one example, device 800 may comprise a portable electronic device, such as a mobile telephone. Device 800 may include various modules, such as a digital module 802 and an RF module 804. Digital module 802 may comprise memory and one or more processors. RF module 804 may include a transceiver 806 including a transmitter 808 and a receiver 810 and may be configured for bi-directional wireless communication via an antenna 812. In general, wireless communication device 800 may include any number of transmitters and any number of receivers for any number of communication systems, any number of frequency bands, and any number of antennas. According to one exemplary embodiment, device 800 may comprise one or more of devices 300 and/or 400 as described above with reference to FIGS. 4 and 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a digital pre-distortion (DPD) circuit configured to generate an amplitude modulation-to-phase modulation (AM-PM) distortion component in response to receipt of an input transmit signal, and to generate an amplitude modulation-to-amplitude modulation (AM-AM) distortion component based on envelope data of the input transmit signal;
   a local oscillator (LO) path coupled to the DPD circuit and configured to convey a LO signal that varies based on the AM-PM distortion component;
   a power amplifier (PA) configured to receive a radio-frequency (RF) transmit signal, via a Cartesian circuit based on the input transmit signal; and
   an envelope tracking supply configured to receive at least a portion of the AM-AM distortion component and at least a portion of a signal envelope and convey a voltage to a power supply port of the power amplifier, not via the Cartesian circuit.

2. The device of claim 1, further comprising a mixer configured to receive the input transmit signal and the LO signal and generate the RF transmit signal.

3. The device of claim 2, wherein the PA is further configured to receive the RF transmit signal from the mixer.

4. The device of claim 1, wherein the LO path includes one of a digital phase-lock loop (PLL) and a voltage controlled oscillator (VCO) configured to receive the AM-PM distortion component.

5. The device of claim 1, wherein the DPD circuit is configured to generate the AM-PM distortion component based on a phase of the input transmit signal.

6. A device, comprising:
   a digital pre-distortion (DPD) circuit configured to receive an input transmit signal convey an amplitude modulation-to-phase modulation (AM-PM) distortion component based on the input transmit signal to one of a digital phase-lock loop (PLL) and a voltage controlled oscillator (VCO) for generating a local oscillator (LO) signal, and generate an amplitude modulation-to-amplitude modulation (AM-AM) distortion component based on the input transmit signal;
   a mixer for receiving the input transmit signal and the LO signal and generating a radio-frequency (RF) transmit signal;
   a power amplifier configured to receive the RF transmit signal via a Cartesian circuit; and
   an envelope tracking supply configured to receive at least a portion of the AM-AM distortion component and at least a portion of a signal envelope and convey a supply voltage to the power amplifier, not via the Cartesian circuit.

7. The device of claim 6, further comprising:
   a digital-to-analog converter (DAC) configured to receive the input transmit signal; and
   a baseband filter coupled to an output of the DAC and an input of the mixer.

8. The device of claim 6, further comprising a frequency divider coupled between one of the PLL and the VCO and the mixer.

9. The device of claim 6, wherein the DPD circuit is further configured to convey the AM-PM distortion component to a digital-to-analog converter (DAC) within a different transmit path.

10. The device of claim 9, wherein the DAC is configured to convey a signal to one of the PLL and the VCO via a baseband filter of the different transmit path.

11. The device of claim 9, further comprising a digital module including the DPD circuit and an RF module including the mixer.

12. A method, comprising:
   generating an amplitude modulation-to-phase modulation (AM-PM) distortion of a power amplifier based on an input transmit signal;
   pre-distorting the input transmit signal by varying a local oscillator (LO) signal based on the AM-PM distortion;
   generating an amplitude modulation-to-amplitude modulation (AM-AM) distortion of the power amplifier based on envelope data of the input transmit signal; and
   varying a supply voltage conveyed to the power amplifier based on the AM-AM distortion, wherein the power amplifier receives a radio-frequency (RF) transmit signal via a a Cartesian circuit, and the varying the supply voltage conveyed to the power amplifier not via the Cartesian circuit.

13. The method of claim 12, wherein pre-distorting comprises:
   conveying the input transmit signal to a mixer via a digital-to-analog converter (DAC) and a baseband filter; and
   conveying the LO signal to the mixer independent of each of the DAC and the baseband filter.

14. The method of claim 12, further comprising up-converting the input transmit signal to the RF transmit signal and conveying the RF transmit signal to the power amplifier.

15. A method, comprising:
   generating an amplitude modulation-to-phase modulation (AM-PM) distortion component based on an input transmit signal;
   modulating a delay of one of a digital phase-lock loop (PLL) and a voltage controlled oscillator (VCO) based on the AM-PM distortion component;
   generating an amplitude modulation-to-amplitude modulation (AM-AM) distortion component based on the input transmit signal; and
   varying a supply voltage conveyed to a power amplifier based on at least a portion of the AM-AM distortion component and at least a portion of a signal envelope, wherein the power amplifier receives a radio-frequency (RF) transmit signal via a Cartesian circuit, and the varying the supply voltage conveyed to the power amplifier is not via the Cartesian circuit.

16. The method of claim 15, the generating comprising generating the AM-PM distortion component based on a phase of the input transmit signal.

17. A device, comprising:
   means for generating an amplitude modulation-to-phase modulation (AM-PM) distortion of a power amplifier based on an input transmit signal;
   means for pre-distorting the input transmit signal by varying a local oscillator (LO) signal based on the AM-PM distortion;
   means for generating an amplitude modulation-to-amplitude modulation (AM-AM) distortion of the power amplifier based on envelope data of the input transmit signal; and
   means for varying a supply voltage conveyed to the power amplifier based on the AM-AM distortion, wherein the power amplifier receives a radio-frequency (RF) transmit signal via a Cartesian circuit, and the varying the supply voltage conveyed to the power amplifier is not via the Cartesian circuit.

18. The device of claim 17, further comprising:
means for conveying the input transmit signal to a mixer via a digital-to-analog converter (DAC) and a baseband filter; and
means for conveying the LO signal to the mixer independent of each of the DAC and the baseband filter.

19. The device of claim 17, further comprising means for up-converting the input transmit signal to the RF transmit signal and conveying the RF transmit signal to the power amplifier.

20. A device, comprising:
means for generating an amplitude modulation-to-phase modulation (AM-PM) distortion component based on an input transmit signal;
means for modulating a delay of one of a digital phase-lock loop (PLL) and a voltage controlled oscillator (VCO) based on the AM-PM distortion component;
means for generating an amplitude modulation-to-amplitude modulation (AM-AM) distortion of a power amplifier based on envelope data of the input transmit signal; and
means for varying a supply voltage conveyed to the power amplifier based on the AM-AM distortion, wherein the power amplifier receives a radio-frequency (RF) transmit signal via a Cartesian circuit, and the varying the supply voltage conveyed to the power amplifier is not via the Cartesian circuit.

* * * * *